United States Patent [19]

Karasaki et al.

[11] Patent Number: 4,529,287
[45] Date of Patent: Jul. 16, 1985

[54] FOCUS CONDITION DETECTION DEVICE FOR CAMERAS

[75] Inventors: Toshihiko Karasaki, Sakai; Hiromu Mukai, Kawachinagano; Kunio Kawamura, Sakai, all of Japan

[73] Assignee: Minolta Camera Kabushiki Kaisha, Osaka, Japan

[21] Appl. No.: 639,672

[22] Filed: Aug. 8, 1984

[30] Foreign Application Priority Data

Aug. 9, 1983 [JP] Japan ............... 58-145962

[51] Int. Cl.³ ................. G03B 3/00; G01J 1/36
[52] U.S. Cl. ................. 354/406; 250/204; 250/237 R
[58] Field of Search ........ 354/406, 407, 408; 250/204, 237 R

[56] References Cited

U.S. PATENT DOCUMENTS

| | | | |
|---|---|---|---|
| 3,875,401 | 4/1975 | Stauffer | 250/201 |
| 4,436,395 | 3/1984 | Fukuhara | 354/406 |

FOREIGN PATENT DOCUMENTS 52-95221  8/1977  Japan .
58-88709  5/1983  Japan .
58-106511 6/1983  Japan .

*Primary Examiner*—William B. Perkey
*Attorney, Agent, or Firm*—Joseph W. Price

[57] ABSTRACT

A focus condition detecting device of the type in which a pair of re-imaging lenses together with a condenser lens form a pair of re-images of an object image on a linesensor, such that the distance between the corresponding points of the re-images on the linesensor varies with the focus condition of a camera objective lens has an improved construction for positioning the linesensor with respect to the device with high accuracy. A field aperture mask having a field aperture is arranged optically behind a plane conjugate with the linesensor with respect to the re-imaging lenses and the condenser lens such that a pair of defocused images of the field aperture are formed on the linesensor by the re-imaging lenses and the condenser lens with respective one side blurred borders of the defocused images overlapping one another to make a V-shaped peak or dip of illuminance on a photocell of the linesensor located on the optical axis of the device, when the field aperture mask is uniformly illuminated. The device is formed into a module attachable on a camera.

15 Claims, 12 Drawing Figures

FOCUS CONDITION DETECTION DEVICE FOR CAMERAS

BACKGROUND OF THE INVENTION

1. Field of the Invention

The present invention relates to a focus condition detecting device for a camera which detects the focusing condition of the objective lens through measurement of the light rays coming from an object to be photographed (hereinafter referred to as object light rays) and having passed through the objective lens.

2. Description of the Prior Art

Many focus detecting devices have been proposed wherein object light rays having passed through first and second areas of the objective lens that are symmetric with each other with respect to the optical axis of the objective lens, are reconcentrated or re-converged by a pair of re-imaging lenses to form images after once concentrated or converged by the objective lens, and the relative positions of the two images are detected to determine the amount and direction of defocus of the object image formed by the objective lens, or the amount and direction of deviation of the position of the object image from a predetermined focal plane (whether the object image is in front of or in the rear of the predetermined focal point, i.e. whether a front focus or a rear focus condition is attained). A typical optical system of such focus detecting devices has a construction as shown in FIG. 1. The optical system includes a condenser lens 6 disposed on or in the back of a predetermined focal plane 4 which in turn is to the rear of an objective lens 2. To the rear of the condenser lens 6 are disposed a pair of re-imaging or relay lenses 8 and 10. A pair of linesensors 12 and 14 which have CCDs as the light detectors, are disposed on the respective predetermined focal planes of the re-imaging lenses. The images formed by re-imaging lenses 8 and 10 on linesensors 12 and 14 are hereinafter referred to as re-images of the object image formed by the objective lens 2. The re-images are nearer or closer to the optical axis 18 and to each other as shown in FIG. 2 when the object image is formed in front of the predetermined focal plane i.e. in the case of front focus. In contrast, the re-images are distant from the optical axis 18 in the case of rear focus. When the objective lens 2 is in an in-focus condition, the distance between two corresponding points of the two re-images has a given value determined by the construction of the optical system of the focus detecting device. Accordingly, the focus condition can be basically determined by detecting the distance of the two re-images based on the outputs of the linesensors. The following method has been known as one of the methods for detecting the distance between the two re-images.

With reference to FIG. 3, sensors 12 and 14 are respectively composed of ten and sixteen photodiode cells 21, a1 to a10 and b1 to b16. Assume for the convenience that the reference characters assigned to each cell also represents the output level of the cell. If consecutive ten cells are to be taken from the sensor 14, seven sets B1, B2 ... B7 can be made. The in-focus condition can be detected by determining on which one of the seven sets is formed the re-image that best coincides with the re-image on the sensor 12. For example, if the re-image on the set B1 of the sensor 14 best coincides with the re-image on the sensor 12, that is, if the relationship of a1=b1, a2=b2 ... a10=b10 is found between outputs of corresponding cells of the two sets a1 to a10 and b1 to b10, the total sum S1 of the absolute values of the differences between outputs of corresponding cells will be the critically as follows:

$$S1 = |a1-b1| + |a2-b2| + \ldots |a10-b10| \ldots = 0 \quad (1)$$

Thus, the values S1 is smaller than any other values calculated in the same way for the sets other than B1. In other words, the value of S1 is the smallest of the sums of the absolute values of the differences calculated in the same way for all the sets. To find the minimum value, the calculations as given by the formula (1) is made for all the sets and the sums obtained from the calculations are compared with one another. If it is detected that the re-image on the set B1 best coincides with the image on the set A1, then it is determined whether the set B1 is at the predetermined standard position, nearer or closer to the optical axis than the standard position or more distant than the same, as well as what is the amount of deviation of the set B1 from the standard position. From the result, it is determined whether the objective lens is in the in-focus, front focus or rear focus condition and also the amount and direction of driving required for the objective lens to be brought into the in-focus condition is calculated. To make such determination and calculation, it is necessary that a particular cell of the linesensor is set at a particular position in the optical system of the focus detecting device and that the ordinal numbers of the other cells with reference to the particular cell can be identified in the program for the determination and calculation. Although in the above explanation two separated linesensors 12 and 14 are used, in practice a part of a single linesensor is used as the linesensor 12 and another part of the same is used as the linesensor 14. Accordingly the aforementioned particular cell may be a particular one of (generally the one at the center of) a single linesensor including the parts for the linesensor 12 and 14. Further, the generality will not be lost even if a particular point on the optical axis is regarded as the particular position in the optical system of the focus detecting device. Thus, it is necessary in practice that a cell at a particular address or ordinal number in a linesensor is exactly positioned on the optical axis of the optical system of a focus detecting device.

However, no practical method has been proposed for exactly positioning and fixing a linesensor relative to the optical system of a focus detecting device. The cells are aligned at the pitch of about 30 $\mu$m in a CCD linesensor and it is required that the linesensor should be positioned with the accuracy of ±15 $\mu$m. One method to be thought primary may be that every part of the focus detecting device should be made with high accuracy such that the linesensor may be positioned exactly only by assembling such parts. However, such a method requires high accuracy in making the parts and is not fit for mass production because the focus detecting device made through this method will be expensive. A method to assemble the device with the aid of jigs requires a standard plane or point to be provided on some portion of parts and is substantially the same as the above method in requiring accuracy in making the parts. Another method may be thought wherein a linesensor is fixed at the position of a focus detecting device where an image of a slit is projected on a particular cell of the linesensor. In this method, the relative positions of the slit and the focus detecting device must be determined such that the slit is exactly positioned on the optical axis of the focus detecting device. However, no proper method for the purpose has been proposed.

SUMMARY OF THE INVENTION

It is accordingly an object of the present invention to provide a focus condition detecting device of the above mentioned type which enables the positioning of the linesensor with respect to the device with high accuracy.

Another object of the present invention is to provide a focus condition detecting device of the above mentioned type which enables the positioning of the linesensor before attaching the device to a camera.

A focus condition detecting device of the present invention is provided with a mask having an opening, optically behind a plane conjugate with a linesensor with respect to a pair of re-imaging lenses such that, when the mask is uniformly illuminated, first and second defocused images of the opening of the mask are formed on the linesensor by the re-imaging lenses with respective one side blurred borders of the first and second defocused images overlapping one another to make a V-shaped peak or dip of illuminance on a photocell of the linesensor located on the optical axis of the device. For positioning, the linesensor is shifted in the direction of the row of its photocells perpendicular to the optical axis until an output of a particular photocell of the linesensor to be located on the optical axis becomes maximum or minimum among outputs of the photocells of the linesensor on which the first and second defocused images are formed. Preferably, the re-imaging lenses are accompanied by a condenser lens arranged optically in front thereof and accordingly the above mentioned plane is conjugate with the linesensor with respect to the re-imaging optical system constituted by the re-imaging lenses and the condenser lens.

In a preferred embodiment of the present invention, the device is formed into a unit module attachable to the camera to enable the positioning of the linesensor independently of the camera. Furthermore, a field aperture mask is commonly used as the above mentioned mask and therefore any extra mask as the original of the defocused images on the linesensor need not be arranged.

The above and other objects and features of the present invention will become apparent from the following description of a preferred embodiment of the present invention taken along with the accompanying drawings.

DESCRIPTION OF A PREFERRED EMBODIMENT

Figure 1:
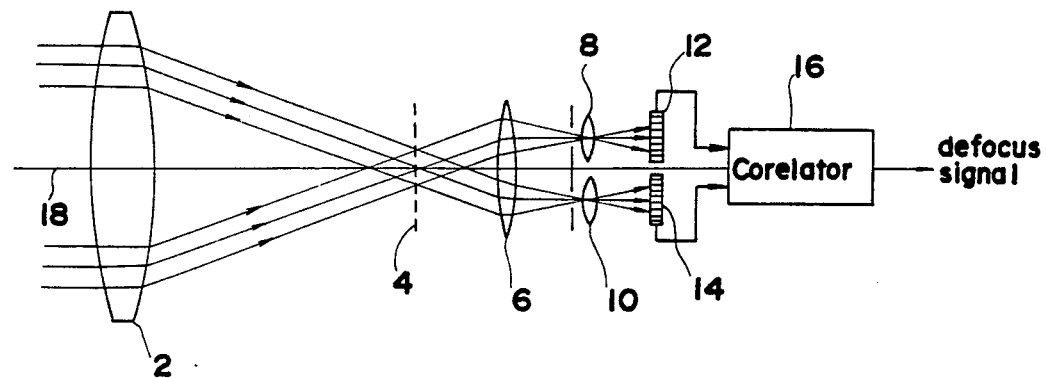
FIG. 1 is a schematic illustration of a typical optical system of known focus condition detecting devices of the type related to the present invention.
Figure 2:
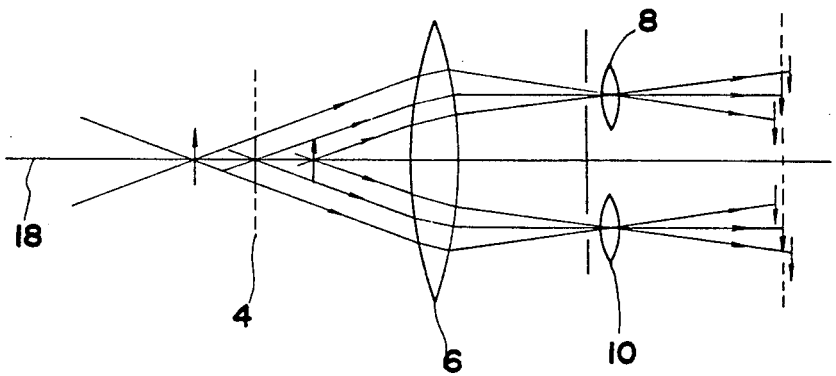
FIG. 2 is an enlarged schematic illustration of a part of the optical system shown in FIG. 1, showing how the re-images of front focus, in-focus and rear focus object images are formed.
Figure 3:
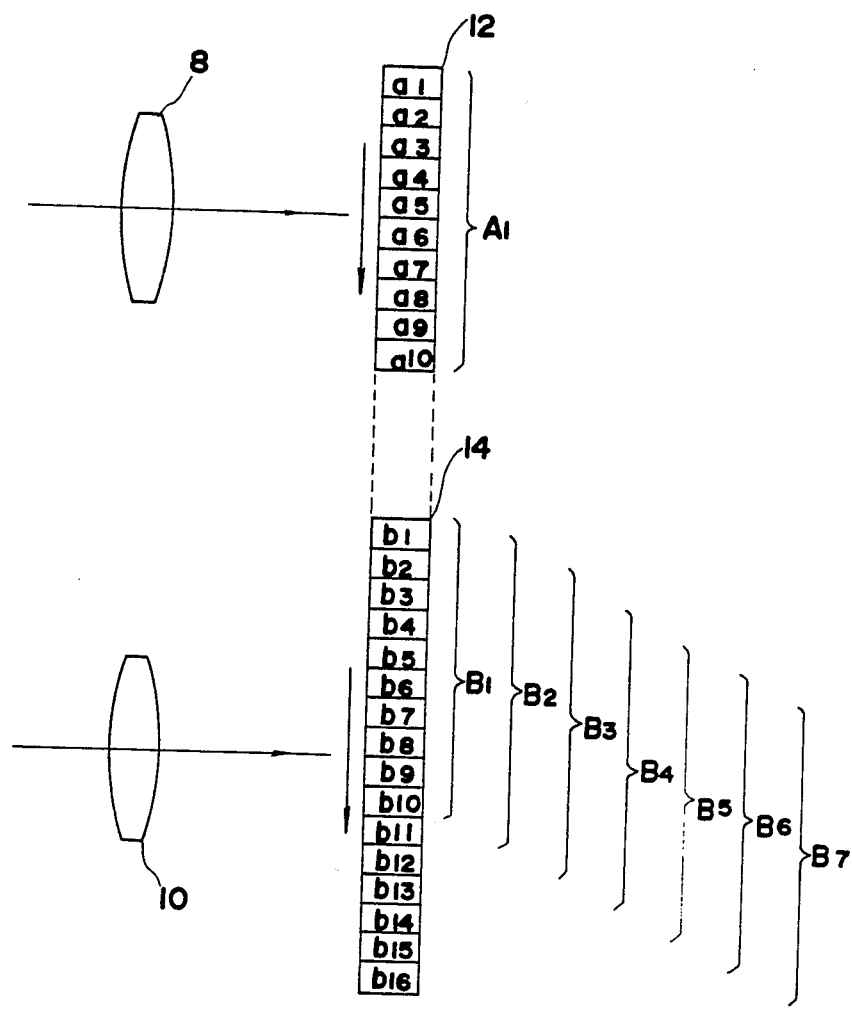
FIG. 3 is an explanatory illustration of linesensors and re-imaging lenses, explaining a known focus condition detecting method.

In advance to the explanation of a preferred embodiment of the present invention, the basic construction and operation of the present invention will now be explained with reference to FIGS. 4, 5A and 5B. Lenses 8 and 10 correspond to the re-imaging lenses in FIG. 1. The reference numeral 4 denotes the predetermined focal plane of an objective lens. A linesensor is located on a plane C. As the condenser lens 6 in FIG. 1 may be basically dispensed with, it is omitted in FIG. 4. The optical axis 18 of the objective lens is also the optical axis of the focus detecting device. A mask 20 with a field aperture 19 is disposed at a position between the lenses 8 and 10 and the predetermined focal plane 4. The image 21A of the aperture 19 is formed on the linesensor plane C by the lens 8 while the image 21B of the same is formed by the lens 10. As the lenses 8 and 10 are set to focus on the linesensor plane C the in-focus image formed on the predetermined focal plane 4, the images 21A and 21B of the aperture 19 disposed between the lenses 8 and 10 and the predetermined focal plane are defocused with their periphery or border being blurred. One aspect of the present invention lies in that the width X of the aperture and its distance L from the lenses 8 and 10 are determined with the separation of the centers of the re-imaging lenses 8 and 10 from the optical axis 18 taken into consideration such that the defocused images 21A and 21B overlap each other at their blurred periphery e. FIG. 5A shows the luminous distribution of the images 21A and 21B on the plane C in FIG. 4. As those images are defocused, the illuminance at their borders do not become suddenly zero but gradually decreases. Accordingly, at the portion e, the inclined portions of both illuminance curves 21A and 21B overlap each other to make a V-shaped peak P of illuminance. The peak of illuminance thus formed is sharp, differing from the blurred defocus images 21A and 21B. Thus, if a cell in the linesensor shows a maximum output, it means that the cell is at the position where the peak P of illuminance is formed. As the peak P is formed on the optical axis 18 with the center of the aperture 19 being on the optical axis 18, the position of the linesensor can be determined by adjusting the linesensor along the direction of the cell alignment such that a proper cell, e.g. the one at the central address, in the linesensor shows the maximum output. The center may be detected in another way wherein the two images 21A and 21B are formed to overlap each other at less portion such that the overlapping of their sloping edge of the illuminance distributions forms a V-shaped dip which may be detected for the adjustment of the linesensor position.

Figure 4:
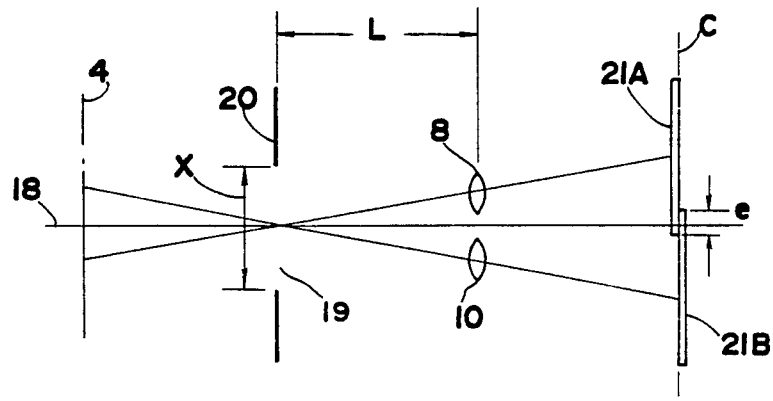
FIG. 4 is a schematic illustration of a principle optical arrangement of the present invention, explaining the principle of the present invention.
Figure 5A:
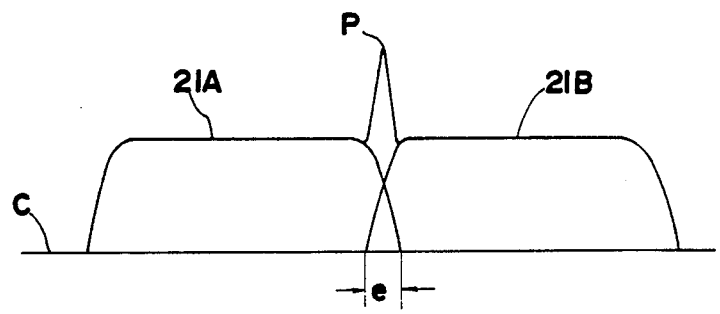
FIGS. 5A and 5B are graphs showing luminous distributions on the linesensor when defocused images of a field aperture uniformly illuminated are formed on the linesensor with respective one side blurred borders thereof overlapping one another to make a V-shaped peak and dip of illuminance, respectively.
Figure 5B:
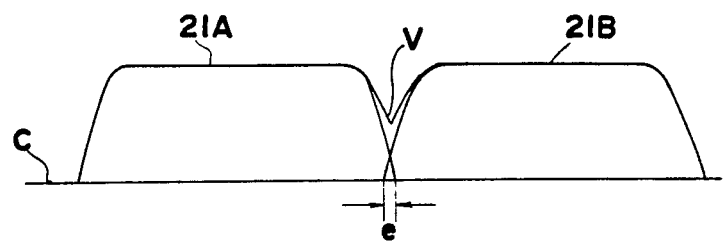

Although the linesensor is located on the place C which is conjugate with the predetermined plane 4 with respect to the re-imaging lenses 8 and 10 in FIG. 4, this is not requisite to the present invention. If the linesensor is located on a plane near the plane C, the predetermined focal plane 4 cannot be conjugate with such a plane with respect to the re-imaging lenses. In general, the mask 20 is to be arranged optically behind a plane which is conjugate with the light receiving surface of the linesensor with respect to the re-imaging lenses 8 and 10. In FIG. 4 there is shown a case where such a plane is coincident with the predetermined focal plane 4. Moreover, if the re-imaging lenses constitute re-imaging optical systems together with a condenser lens as shown in FIG. 1, the mask is to be arranged optically behind a plane which is conjugate with the light receiving surface of the linesensor with respect to the re-imaging optical systems constituted by the re-imaging lenses and the condenser lens.

Figure 6:
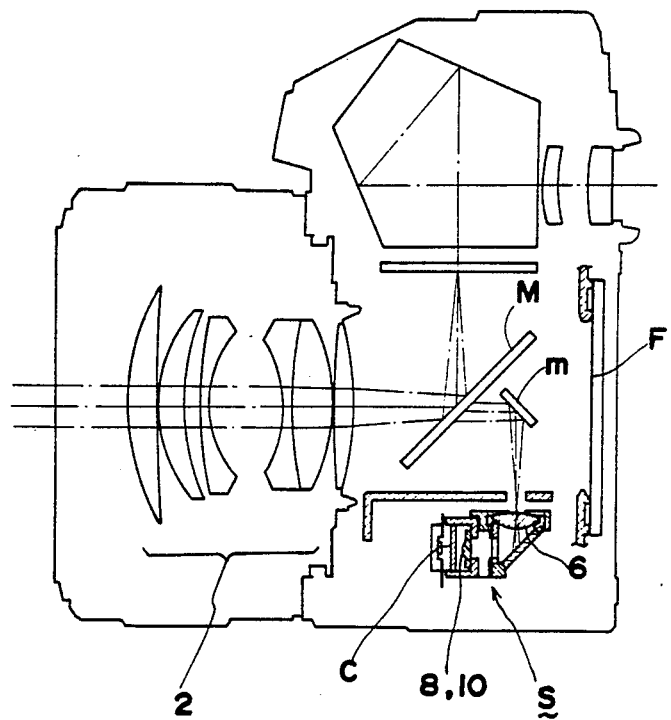
FIG. 6 is a schematic illustration of the overall optical system of a single lens reflex camera to which a focus condition detecting device according to a preferred embodiment of the present invention is employed as a unit module.
Figure 7:
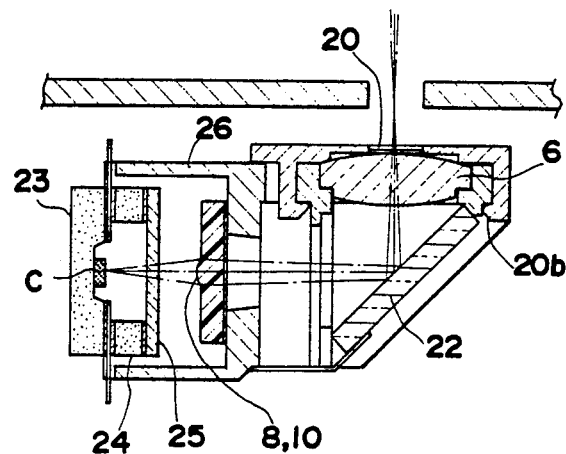
FIG. 7 is a vertical cross-sectional view of the module.
Figure 8:
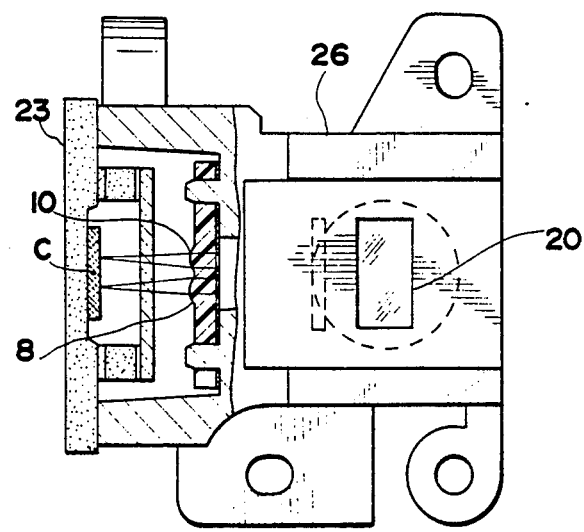
FIG. 8 is a plan view of the module partially in section.

FIG. 6 shows a focus detecting device according to a preferred embodiment of the present invention which device is arranged within a single lens reflex camera. The object light rays having passed through the objective lens 2 is split by a reflex mirror M. A small mirror m is mounted on the reflex mirror M and located at the back of the light transmissive or permeable portion of the reflex mirror M to fold downward the optical axis of or light path from the objective lens 2. The reference character S generally refers to the focus detecting device according to the present invention. The device is integrally formed as a unit module and located under the bottom wall of the mirror box of the camera. The object light rays having passed through the objective lens 2 traverse the reflex mirror M and are reflected by the small mirror m, falling on the focus detecting device S. In the device S, the same reference characters are assinged to the components corresponding to those in FIG. 1. The reference numeral 6 denotes the condenser lens. The re-imaging lenses 8 and 10 are aligned in the direction normal to the plane of the drawing so that only the lens 8 is seen in FIG. 1. The reference character C denotes the CCD linesensor. FIG. 7 is a vertical sectional view of the focus detecting device S while FIG. 8 is a plane view of the same partially in section. With reference to FIG. 7, a mirror 22 folds the optical axis of the condenser lens 6 by 90° to make compact the entire device S. A field aperture mask or light restriction mask 20 disposed in front of the condenser lens 6 has a rectangular field aperture 19 of the shape as shown in FIG. 8. The mask 20 corresponds to the mask 20 explained with reference to FIG. 4. In other words, the mask in front of the condenser lens is utilized, in the embodiment, as the mask 20 in FIG. 4. The CCD linesensor C is mounted on a base plate 23 and is covered by a glass plate 25 with a spacer 24 therebetween. Parts C, 23, 24, and 25 are put together to form a unit module.

The front rear surface of the base plate 23, which is parallel with the linesensor and perpendicular to the optical axis of the device S, is brought into contact with the end flat surface of the module main body 26 and is cemented thereto. In FIG. 7, the cells of the CCD linesensor C are aligned in the direction normal to the plane of the drawing. Before the cement becomes solid, the base plate 23 is slid in the vertical direction as viewed in FIG. 8 (in the transverse direction of the camera) until its proper position is detected through the method as described before whereupon the base plate is stopped, waiting for the solidification of the cement.

Figure 9:
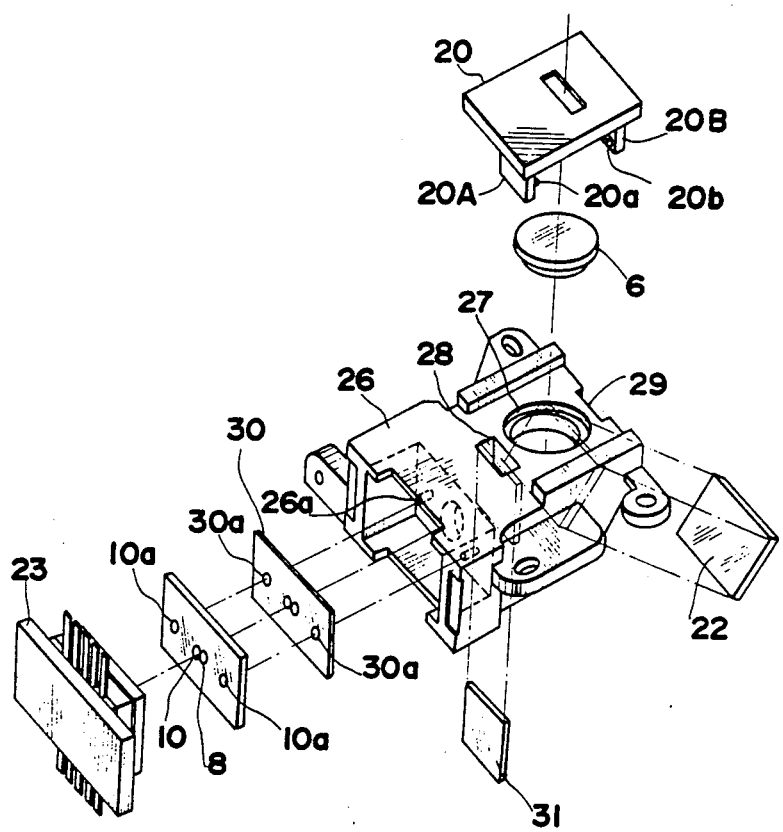
FIG. 9 is an exploded perspective view of the module.

FIG. 9 is an exploded perspective view of the focus detecting devices. The condenser lens 6 is received by the stepped portion of the circular through-hole 27 on the upper plane of the module main body 26 so that the position of the condenser lens 6 is determined relative to the module main body. The mask 20 is positioned with its engaging pieces 20A and 20B fitting into the rectangular hole 28 and groove 29 of the module main body 26, and is fastened and prevented from disengaging with the projecting pieces 20a and 20b formed on an interior surface of the engaging pieces 20A and 20B engaging the main body of the module. The mask 20 comes into contact with the upper surface of the condenser lens 6 to hold the latter. The re-imaging lenses 8 and 10 are integrally formed of a transparent plastic material and are positioned along with a diaphragm aperture mask 30 for the both with their holes 10a and 30a at their respective sides receiving pins 26a projecting from the module main body 26. An infrared cutting filter 31 is disposed in front of the mirror 22.

Figure 10:
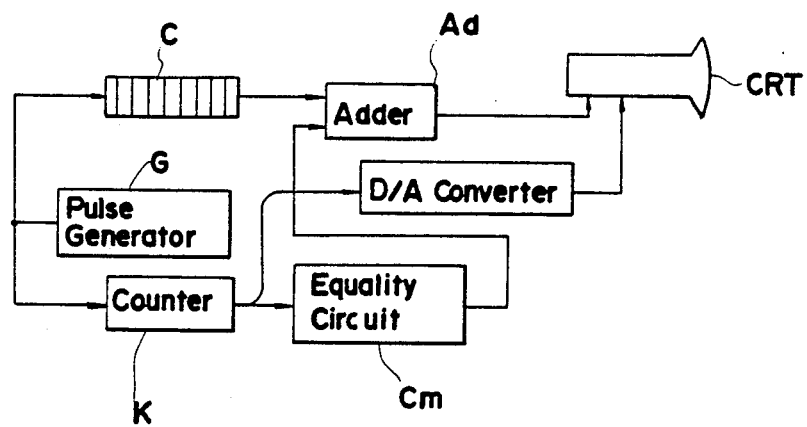
FIG. 10 is a block diagram showing a device suited for effecting the positioning of the linesensor.
Figure 11:
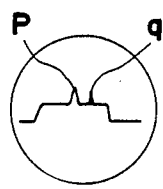
FIG. 11 shows a CRT display of the linesensor output.

With the above described construction, the positioning of the linesensor is carried out independently of the camera in the focus detecting device S alone. FIG. 10 is a block diagram showing a device suited for effecting the positioning of the linesensor. A pulse generator G produces pulses for causing a linesensor C to generate outputs. The clock pulses output from the pulse generator is counted by a counter K whose output signal is converted into an analogue signal by a D/A converter and applied to a display CRT as an X-axis signal. The output signal from the linesensor C is supplied through an adder circuit Ad to the CRT as a Y-axis signal. Those construction repeats the scanning of the linesensor C. The counted value signal of the counter K is compared with a given value by an equality circuit Cm which generates a pulse when the counted value reaches the given value. The pulse generated is added to the output of the linesensor by the adder circuit A. After the linesensor C is temporarily cemented on the end surface of the module main body 26, the field aperture of the mask 20 is illuminated uniformly and the circuit shown in FIG. 10 is activated. Then, the CRT displays an image as shown in FIG. 11. Such an image is the image representative of the graph shown in FIG. 5A. Additionally, as the output pulse of the equality circuit Cm is added to the output of the linesensor C, a projection q appears at a position corresponding to a particular cell in the linesensor. The particular cell is selected by the given value set in the equality circuit Cm. The worker may slide transversely the linesensor C relative to the module main body 26 until the peak in the displayed image coincide with the projection q whereupon the particular cell in the linesensor resides at the position of the peak where the two images of the mask 20 formed by the re-imaging lenses 8 and 10 and condenser lens 6 overlap each other. The above process can be effected easily if a jig is used which supports the module main body 26, has a screw for moving the linesensor with a small pitch and also has a clip mechanism for securing the linesensor on the module main body. If the position of the linesensor is determined, the clip mechanism may be activated to secure the linesensor on the module main body, waiting for the solidification of the cement.

As is understood from the above explanation, according to the present invention, the position of the linesensor may be adjusted such that a cell at a given address in the linesensor produces the maximum or minimum output. Hence, the adjusting operation is easy. Additionally, as the position where the output assumes the maximum or minimum value is the position of the peak or dip of illuminance formed by the overlapping of the blurred border portions of the two defocused images on the linesensor, with the peak or dip being sharp, so that the accuracy of positioning of the linesensor will be within the width of a single cell of the linesensor.

Moreover, if the field aperture mask 20 is commonly used as the original of the defocused images on the linesensor as so far described, any additional original need not be arranged for the position adjustment of the linesensor so that such a trouble will not occur as otherwise will do for the accurate setting of the relative positions of the additonal original and the focus detecting device.

What is claimed is:

1. A focus condition detecting device for a camera which includes an objective lens for forming an object image, said device comprising:
    a linesensor having a number of photocells arranged in a row;
    a pair of re-imaging lenses for forming first and second re-images of said object image on said linesensor, resepectively, such that the distance between the corresponding points of said first and second re-images on said linesensor varies with the focus condition of said objective lens; and
    a mask which has an opening and which is arranged optically behind a plane conjugate with said linesensor with respect to said re-imaging lenses such that first and second defocused images of said opening are formed on said linesensor by said re-imaging lenses, with respective one side blurred borders of said first and second defocused images of said opening overlapping one another to make a V-shaped peak or dip of illuminance on a particular photocell of said linesensor when said mask is uniformly illuminated.

2. A focus condition detecting device as defined in claim 1, wherein said mask is a field aperture mask which has as said opening a field aperture for restricting the field of view viewed from said linesensor through said re-imaging lenses.

3. A focus condition detecting device as defined in claim 1, wherein said plane conjugate with said linesensor with respect to said re-imaging lenses is coincident with a predetermined focal plane of said objective lens.

4. A focus condition detecting device as defined in claim 1, further comprising a condenser lens arranged optically between said mask and said re-imaging lenses, said re-imaging lenses co-operating with said condenser lens for forming said first and second re-images of said object image and said first and second defocused images of said opening on said linesensor, and said plane being conjugate with said linesensor with respect to said re-imaging lenses and said condenser lens.

5. A focus condition detecting device for a camera which includes an objective lens for forming an object image, said device comprising:
    a linesensor having a number of photocells arranged in a row;
    a condenser lens;
    a pair of re-imaging lens arranged to co-operate with said condenser lens for forming first and second re-images of said object image on said linesensor, respectively, such that the distance between the corresponding points of said first and second re-images on said linesensor varies with the focus condition of said objective lens; and
    a mask which has an opening and which is arranged optically behind a plane conjugate with said linesensor with respect to said re-imaging lenses and said condenser lens such that defocused images of said opening are formed on said linesensor by said re-imaging lenses and said condenser lens with respective one side blurred borders of said first and second defocused images overlapping one another to make a V-shaped peak or dip of illuminance on a particular photocell of said linesensor when said mask is uniformly illuminated.

6. A focus condition detecting device as defined in claim 5, wherein said mask is a field aperture mask which has as said opening a field aperture for restricting the field of view viewed from said linesensor through said re-imaging lenses and said condenser lens.

7. A focus condition detecting device as defined in claim 5, wherein said plane conjugate with said linesensor with respect to said re-imaging lenses and said condenser lens is coincident with a predetermined focal plane of said objective lens.

8. A focus condition detecting module for use in a camera which includes an objective lens for forming an object image, said module comprising:
    a linesensor having a number of photocells arranged in a row;
    a base plate supporting said linesensor and having a flat engaging face parallel to said linesensor;
    a condenser lens;
    a pair of re-imaging lenses co-operating with said condenser lens for forming first and second re-images of said object image on said linesenser, respectively, such that the distance between the corresponding points of said first and second re-images on said linesensor varies with the focus condition of said objective lens;
    a field aperture mask having a field aperture for restricting the field of view viewed from said linesensor through said re-imaging lenses and said condenser lens; and
    a main body having a flat engaging face which is fixedly in contact with said flat engaging face of said base plate and supporting said condenser lens, said re-imaging lenses and said field aperture mask to position said field aperture mask optically behind a plane conjugate with said linesensor with respect to said re-imaging lenses and said condenser lens such that first and second defocused images of said field aperture are formed on said linesensor by said re-imaging lenses and said condenser lens with respective one side blurred borders of said first and second defocused images overlapping one another to make a V-shaped peak or dip of illuminance on a particular photocell of said linesensor when said field aperture mask is uniformly illuminated.

9. A focus condition detecting module as defined in claim 8, wherein said flat engaging face of said base plate is cemented on said flat engaging face of said main body.

10. A focus condition detecting module as defined in claim 9, wherein said field aperture is of a rectangular shape having its longitudinal side disposed such that the longitudinal direction of said first and second defocused images aligns with the direction of the row of said photocells.

11. A focus condition detecting module as defined in claim 8 wherein said main body includes receiving pins and said re-imaging lenses includes corresponding holes for mounting on said receiving pins.

12. A focus condition detecting module as defined in claim 8 wherein said field aperture mask includes engaging pieces and said module main body includes complementary locking means for securing said engaging pieces.

13. A focus condition detecting module as defined in claim 12 wherein said condenser lens is secured to said module main body by said field aperture mask.

14. A method of aligning a focus condition detecting module for use in a camera having a module body, a field aperture mask, a condenser lens, re-imaging lenses and sensor means with a plurality of photocells for producing an output from the photocells comprising the steps of:

illuminating the field aperture mask to provide a pair of defocused images of the aperture mask on the sensor means;

determining if the sensor means produces a significant difference in output of a photocell representative of a point equidistance from the center of each defocused image, and moving the sensor means relative to the module body until the significant difference output coincides with a predetermined position of a particular photocell whereby the sensor means is aligned for a focus condition detecting operation.

15. In an improved camera having a focus condition detecting device mounted within the camera body on the image side of an objective lens and aligned with an optical axis of the objective lens, the improvement comprising:

a filed aperture mask;

a condenser lens;

photocell means for providing signals of illumination striking it; and a pair of spaced lenses for providing respective images of a real image formed by the objective lens, the width of the aperture mask, the distance between the lenses and the distance from the aperture mask to the palne of the pair of lenses being such to provide a significant difference in output of the photocell means to represent a point equidistance from each respective image when the field aperture mask is illuminated whereby the point of equidistance is positioned on the optical axis of the camera's objective lens.

* * * * *